United States Patent
Lee (10) Patent No.: US 10,782,486 B2
(45) Date of Patent: Sep. 22, 2020

(54) FIBER OPTIC CONNECTOR

(71) Applicant: SHEN ZHEN WONDERWIN TECHNOLOGY CO., LTD., Shenzhen, Guangdong Province (CN)

(72) Inventor: Yen-Chang Lee, Kaohsiung (TW)

(73) Assignee: SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/539,250

(22) Filed: Aug. 13, 2019

(65) Prior Publication Data

US 2020/0057204 A1 Feb. 20, 2020

(30) Foreign Application Priority Data

Aug. 16, 2018 (TW) .............................. 107211229 U (51) Int. Cl.
*G02B 6/38* (2006.01)

(52) U.S. Cl.
CPC ........... *G02B 6/387* (2013.01); *G02B 6/3825* (2013.01); *G02B 6/3893* (2013.01); *G02B 6/3821* (2013.01); *G02B 6/3874* (2013.01); *G02B 6/3895* (2013.01)

(58) Field of Classification Search
None
See application file for complete search history.

(56) References Cited

U.S. PATENT DOCUMENTS

| | | | |
|---|---|---|---|
| 9,817,194 B2* | 11/2017 | Childers | G02B 6/3898 |
| 2013/0216185 A1* | 8/2013 | Klavuhn | G02B 6/38 385/60 |
| 2013/0322825 A1* | 12/2013 | Cooke | G02B 6/3831 385/59 |
| 2015/0378113 A1* | 12/2015 | Good | G02B 6/3831 385/71 |
| 2017/0329090 A1* | 11/2017 | Chang | G02B 6/3874 |

* cited by examiner

*Primary Examiner* — Jerry Rahll
(74) *Attorney, Agent, or Firm* — Muncy, Geissler, Olds & Lowe, P.C.

(57) ABSTRACT

A fiber optic connector includes a plug-in unit, a connecting unit, and a sleeving unit. The plug-in unit includes a switch member that is operable to move between a locking position and an adjusting position. The connecting unit includes a surrounding body that is formed with two through grooves. When the switch member is at the adjusting position, the switch member is moved away from of the through grooves and the connecting unit is operable to be separated from the plug-in unit. When the switch member is at the locking position, the switch member is moved into one of the through grooves to prevent separation of the connecting unit from the plug-in unit.

9 Claims, 12 Drawing Sheets

FIBER OPTIC CONNECTOR

CROSS-REFERENCE TO RELATED APPLICATION

This application claims priority of Taiwanese Patent Application No. 107211229, filed on Aug. 16, 2018.

FIELD

The disclosure relates to a connector, and more particularly to a fiber optic connector.

BACKGROUND

Figure 1:
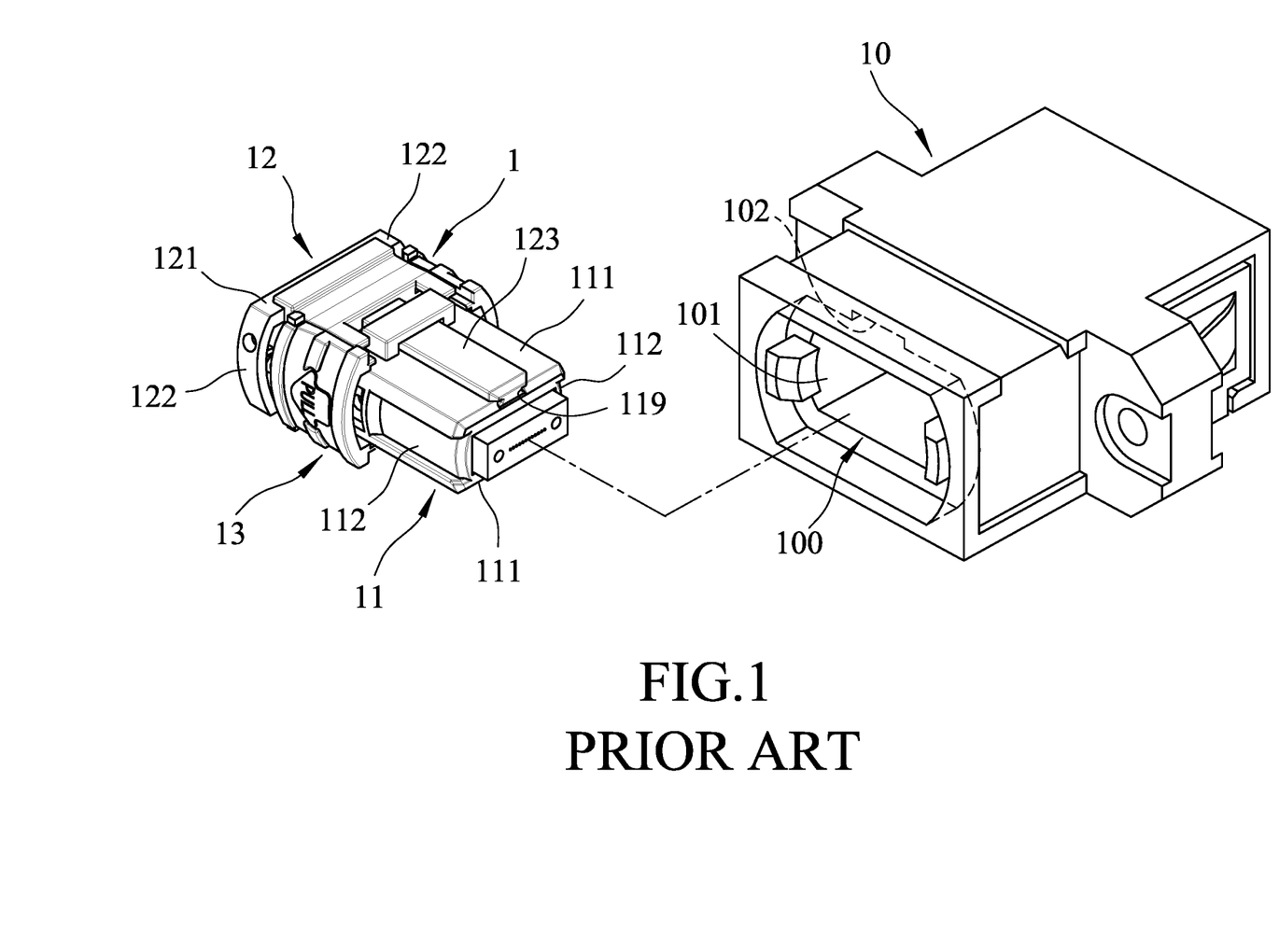
FIG. 1 is a partly exploded perspective view illustrating a conventional fiber optic adapter being plugged to an adapter.

Referring to FIG. 1, a conventional fiber optic connector 1 is adapted to be plugged into a plugging hole 100 of an adapter 10. The plugging hole 100 of an adapter 10 has a main hole portion 101 and a keyway 102 that is in spatial communication with the main hole portion 101. The fiber optic connector 1 includes a main body unit 11, a connecting unit 12 separably connected to a rear end of the main body unit 11, and a sleeving unit 13 sleeved to the main body unit 11 and disposed to a front end of the connecting unit 12.

The main body unit 11 is formed with a shape that is adapted to be plugged into the main hole portion 101 of the plugging hole 100, and includes two spaced-apart and parallel main walls 111 each of which is formed with a guiding groove 119, and two spaced-apart side walls 112 that are respectively connected to two opposite lateral edges of each of the main walls 111. To ensure that the fiber optic connector 1 can be fittingly engaged with the plugging hole 100, the connecting unit 12 includes two base walls 121 (only one is shown) that respectively overlay the main walls 111, two connecting walls 122 that are respectively connected to two opposite lateral edges of each of the base walls 121, and a connecting key 123 that extends forwardly from one of the base walls 121, that engages a selected one of the guiding grooves 119, and that is adapted for extending into the keyway 102 of the plugging hole 100.

Figure 2:
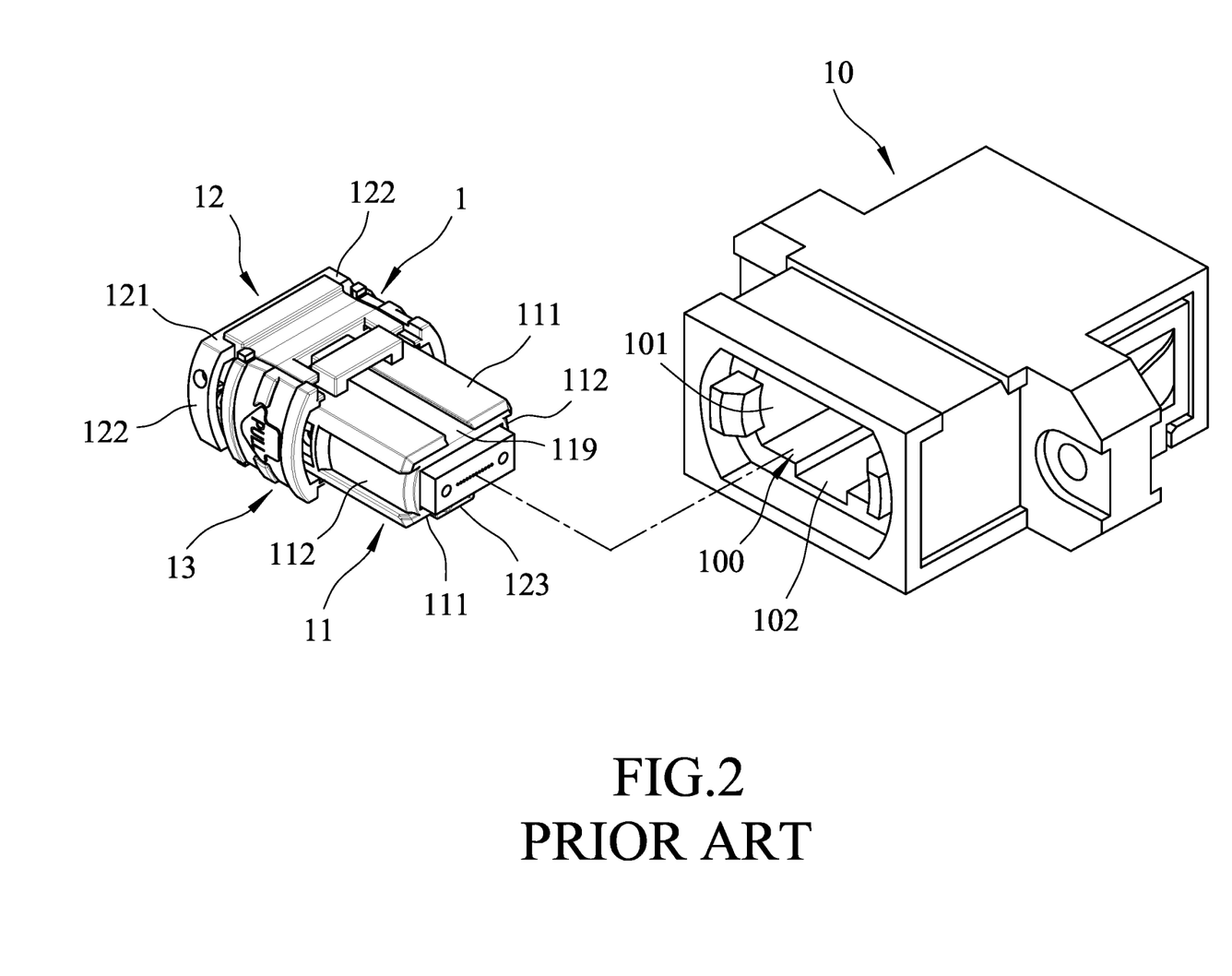
FIG. 2 is a partly exploded perspective view illustrating the conventional fiber optic adapter being plugged to an adapter with a different configuration.

Referring to both FIGS. 1 and 2, since the adapter 10 comes in two different configurations, in which the keyway 102 is formed on different sides of the main hole portion 101, by changing the orientation in which the connecting unit 12 connects to the main body unit 11, the connecting key 123 can be easily relocated relative to the main body unit 11 to properly extend into the keyway 102 of the plugging hole 100, thereby allowing the fiber optic connector 1 to be plugged into the plugging hole 100 of the adapter 10.

The sleeving unit 13 ensures that the connecting unit 12 would not be separated from the main body unit 11 when the fiber optic connector 1 is plugged in. However, when it becomes necessary to change the orientation of the connecting unit 12 relative to the main body unit 11 so that the optic fiber connector 1 may fit through the plugging hole 100 of the adapter 10, the sleeving unit 13 is required to be removed alongside the connecting unit 12 in order to reassemble the optic fiber connector 1. This reassembling process is time-consuming, and may become detrimental to the quality of the optic fiber connector 1 if done excessively.

SUMMARY

Therefore, an object of the disclosure is to provide a fiber optic connector that can alleviate at least one of the drawbacks of the prior art.

According to the disclosure, the fiber optic connector is adapted to be plugged into a plugging hole of an adapter in a front-rear direction. The plugging hole has a main hole portion and a keyway that is in spatial communication with the main hole portion. The fiber optic connector includes a plug-in unit, a connecting unit, and a sleeving unit.

The plug-in unit is adapted to be plugged into the main hole portion of the plugging hole, and includes a hollow outer casing that defines an inner space therethrough which extends in the front-rear direction, a wiring module that is mounted in and that extends forwardly from the inner space, and that is for being engaged with an optical fiber, a positioning member that is removably engaged with a rear end of the outer casing and that extends into the inner space, and a switch member that is movably mounted to the positioning member, that is movable in a lateral direction perpendicular to the front-rear direction, and that is operable to move between a locking position and an adjusting position.

The connecting unit is separably connected to a rear end of the plug-in unit, and includes a surrounding body that surrounds the outer casing and that is formed with two through grooves respectively extending through two opposite lateral sides of the surrounding body in the lateral direction, and a connecting key that extends forwardly from the surrounding body, and that is adapted for extending into the keyway of the plugging hole when the plug-in unit is plugged into the main hole portion. When the switch member of the plug-in unit is at the adjusting position, the switch member is moved outside of and away from the through grooves and the connecting unit is operable to be separated from the plug-in unit, and when said switch member is at the locking position, the switch member is moved toward and into one of the through grooves to prevent separation of the connecting unit from the plug-in unit.

The sleeving unit is sleeved to the plug-in unit, disposed to a front end of the connecting unit, and lapped over the connecting key.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
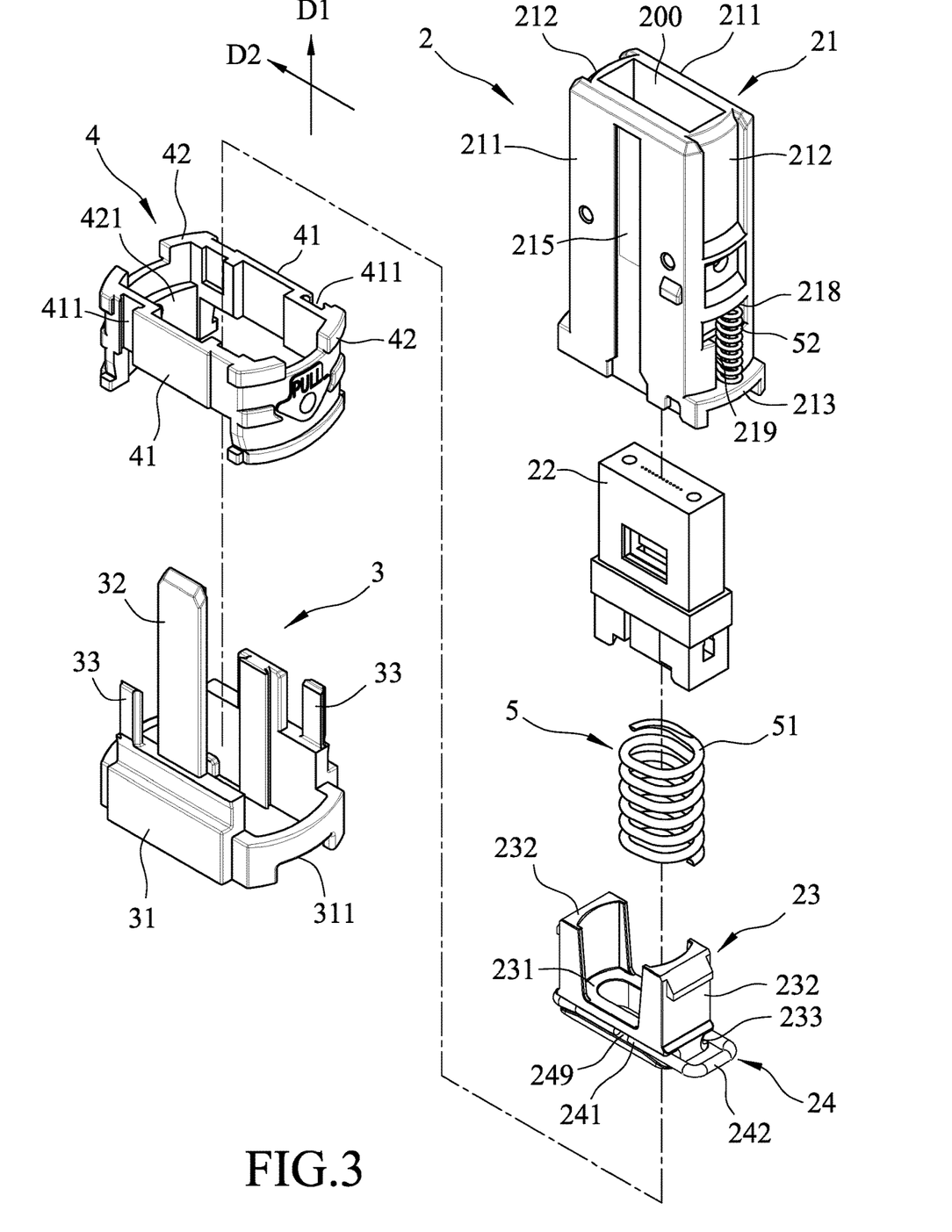
FIG. 3 is an exploded perspective view of an embodiment of a fiber optic connector according to the disclosure.
Figure 4:
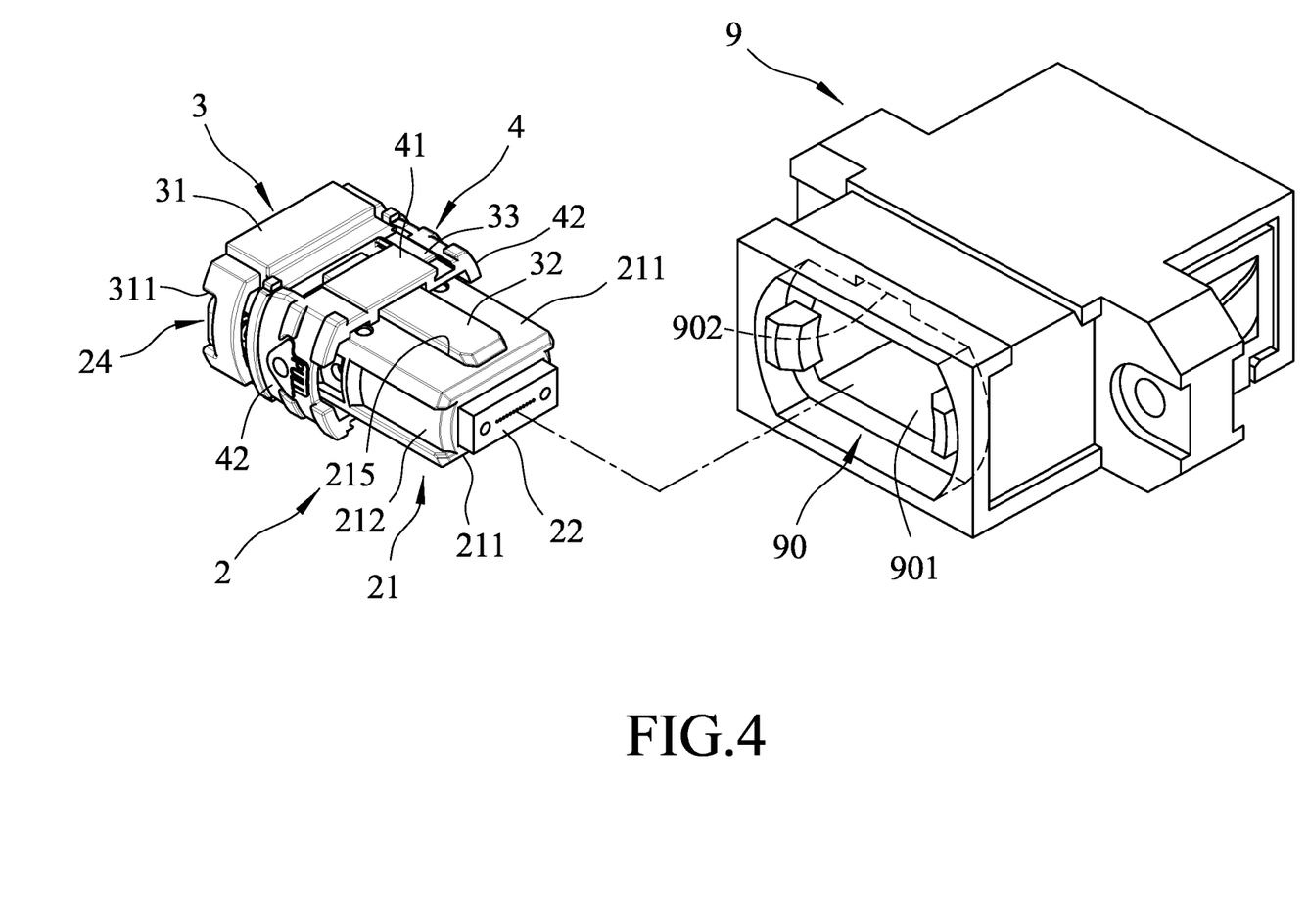
FIG. 4 is a partly exploded perspective view illustrating the embodiment being adapted to be plugged to an adapter.

Referring to FIGS. 3 and 4, an embodiment of a fiber optic connector according to the disclosure is adapted to be plugged into a plugging hole 90 of an adapter 9 in a front-rear direction (D1). The plugging hole 90 has a main hole portion 901 and a keyway 902 that is in spatial communication with the main hole portion 901. In the embodiment, the fiber optic connector includes a plug-in unit 2 adapted to be plugged into the main hole portion 901 of the plugging hole 90, a connecting unit 3 separably connected to a rear end of the plug-in unit 2, a sleeving unit 4 sleeved to the plug-in unit 2 and disposed to a front end of the connecting unit 3, and a buffering unit 5 that is mounted to the plug-in unit 2.

Figure 5:
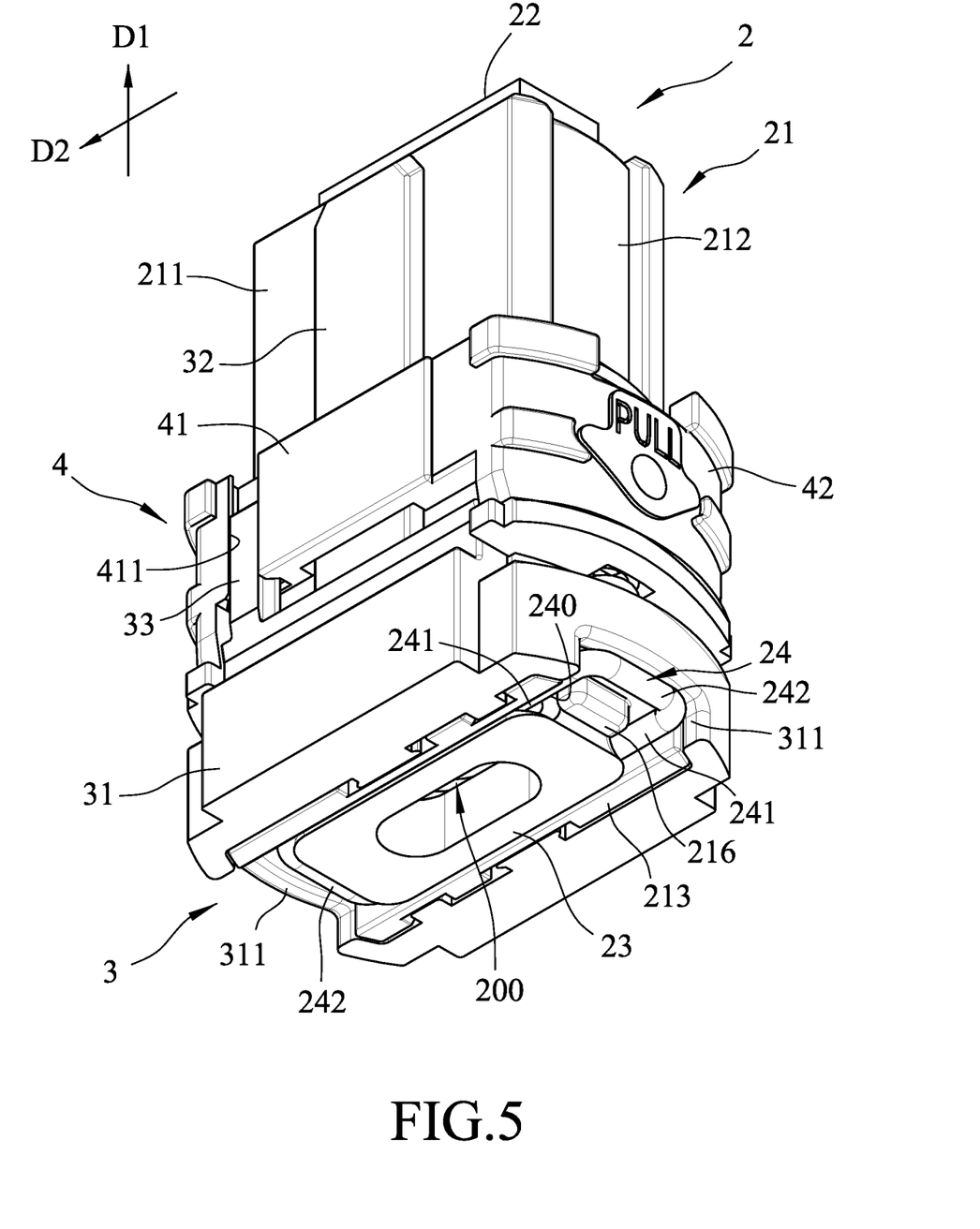
FIG. 5 is an assembled perspective view of the embodiment.

Referring to FIGS. 3 to 5, the plug-in unit 2 includes a hollow outer casing 21, a wiring module 22, a positioning member 23, and a switch member 24. The outer casing 21 defines an inner space 200 therethrough which extends in the front-rear direction (D1). The wiring module 22 is mounted in and extends forwardly from the inner space 200, and is for being engaged with an optical fiber. The positioning member 23 is removably engaged with a rear end of the outer casing 21, and extends into the inner space 200. The switch member 24 is movably mounted to the positioning member 23, is movable in a lateral direction (D2) perpendicular to the front-rear direction (D1), and is operable to move between a locking position and an adjusting position.

The outer casing 21 has two spaced-apart and parallel main walls 211 each of which is formed with a guiding groove 215 extending in the front-rear direction (D1), two spaced-apart side walls 212 that are respectively connected to two opposite lateral edges of each of the main walls 211, and an end wall 213 that is connected to rear ends of the main walls 211 and the side walls 212.

Figure 6:
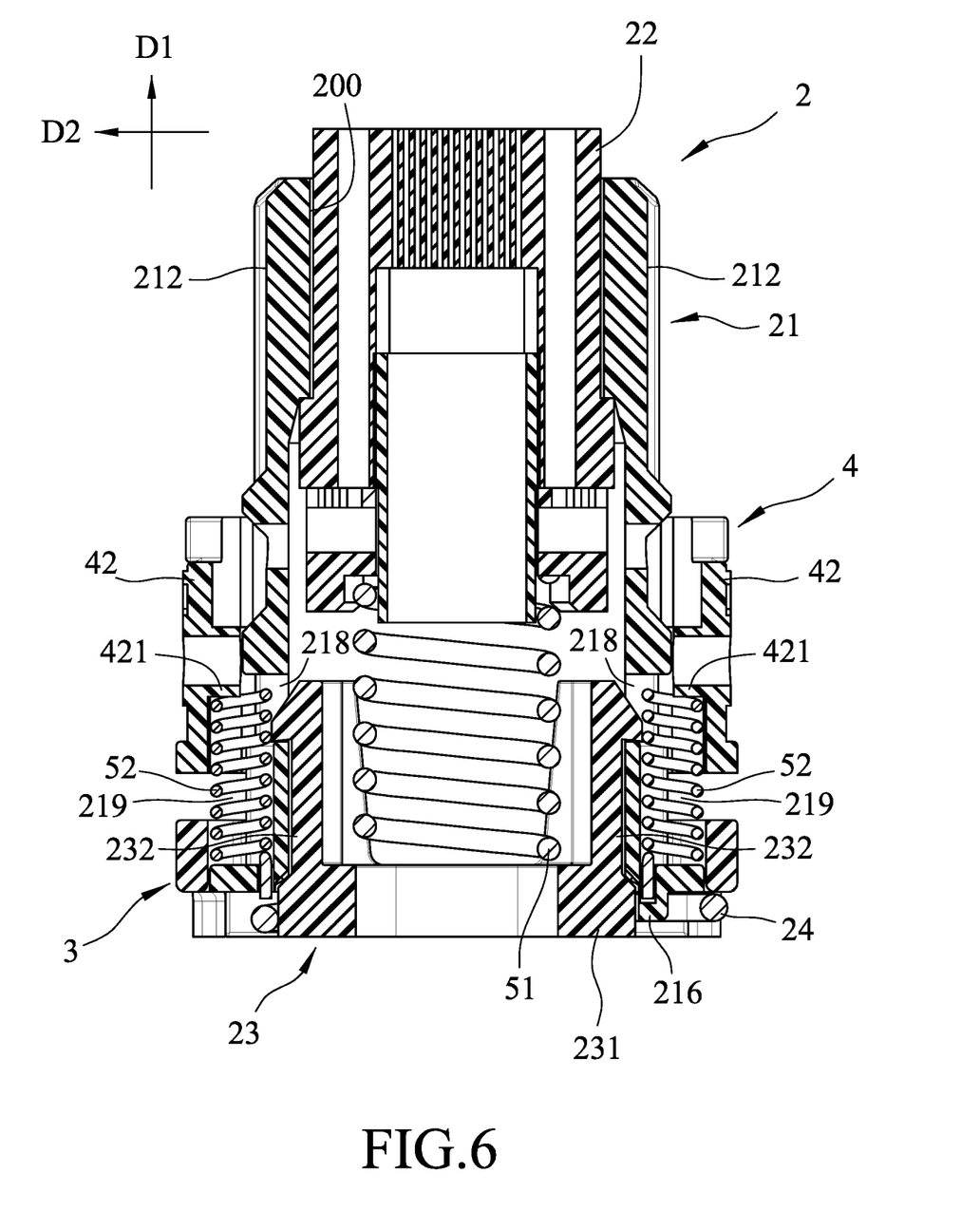
FIG. 6 is a top sectional view of the embodiment.

Referring to FIGS. 5 and 6 alongside FIG. 3, each of the side walls 212 is formed with a through hole 218 that is spatially communicated with the inner space 200, and an indented mounting groove 219 formed at an outer side thereof. The end wall 213 is formed with a protruded segment 216 (see FIGS. 5 and 6) protruding rearwardly therefrom.

The positioning member 23 has a base portion 231, two hook portions 232 that extend forwardly from the base portion 231 and that respectively hook onto the through holes 218 to be positioned thereto, and two switch grooves 233 that extend in the lateral direction (D2) and that are respectively indented into two opposite sides of the base portion 231. The switch member 24 has two moving segments 241 that are respectively and movably mounted in the switch grooves 233 and two interconnecting segments 242 that are respectively connected to two opposite ends of each of the moving segments 241 and that cooperate with the moving segments 241 to define a central hole 240 thereamong. In one embodiment, one of the moving segments 241 has a cutoff section 249, which enables the switch member 24 to be easily assembled onto the positioning member 23.

The buffering unit 5 includes a central spring 51 mounted in the inner space 200 and disposed between the wiring module 22 and the positioning member 23, and two lateral springs 52 respectively mounted to the mounting grooves 219 of the side walls 212.

Figure 7:
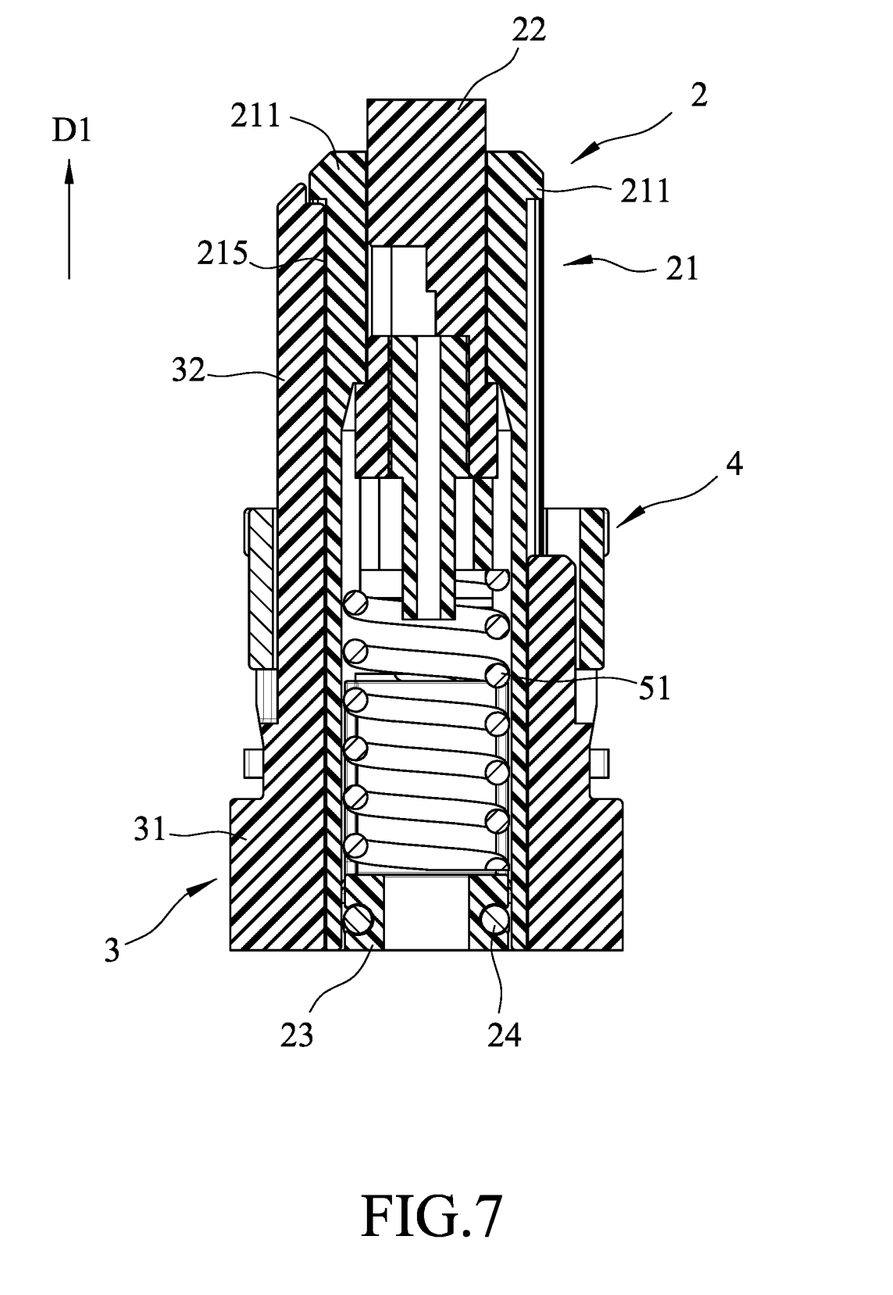
FIG. 7 is a side sectional view of the embodiment.

Referring to FIG. 7 in conjunction with FIGS. 4 and 5, the connecting unit 3 includes a surrounding body 31 that surrounds the outer casing 21, a connecting key 32 that extends forwardly from the surrounding body 31, and two coupling tongues 33 that extend forwardly in the front-rear direction (D1) from the surrounding body 31. The surrounding body 31 is formed with two through grooves 311 respectively extending through two opposite lateral sides of the surrounding body 31 in the lateral direction (D2). The connecting key 32 is to be engaged with a selected one of the guiding grooves 215 of the plug-in unit 2, and is adapted for extending into the keyway 902 of the plugging hole 90 when the plug-in unit 2 is plugged into the main hole portion 901.

The protruded segment 216 of the end wall 213 is proximate to one of the through grooves 311 of the connecting unit 3, and protrudes outwardly into the central hole 240 of the switch member 24 for restricting range of movement of the switch member 24. When the switch member 24 is at the locking position (see FIG. 5), one of the interconnecting segments 242 proximate to the protruded segment 216 is moved into a corresponding one of the through grooves 311. When the switch member 24 is at the adjusting position (see FIG. 9), the interconnecting segment 242 proximate to the protruded segment 216 is moved away from the corresponding one of the through grooves 311, and abuts against the protruded segment 216.

Referring back to FIGS. 5 and 6, the sleeving unit 4 includes two parallel and spaced-apart lapping walls 41 that is for lapping over the connecting key 32, and two spaced-apart curved walls 42 that are respectively connected to two lateral edges of each of the lapping walls 41. Each of the lapping walls 41 has a coupling groove 411 that extends in the front-rear direction (D1). Each of the curved walls 42 has a positioning block 421 that protrudes inwardly toward the other one of the curved walls 42, and that abuts against a front end of a corresponding one of the lateral springs 52. When the connecting unit 3 is connected to the rear end of the plug-in unit 2, the coupling tongues 33 of the connecting unit 3 respectively extend into the coupling grooves 411 of the lapping walls 41.

Figure 8:
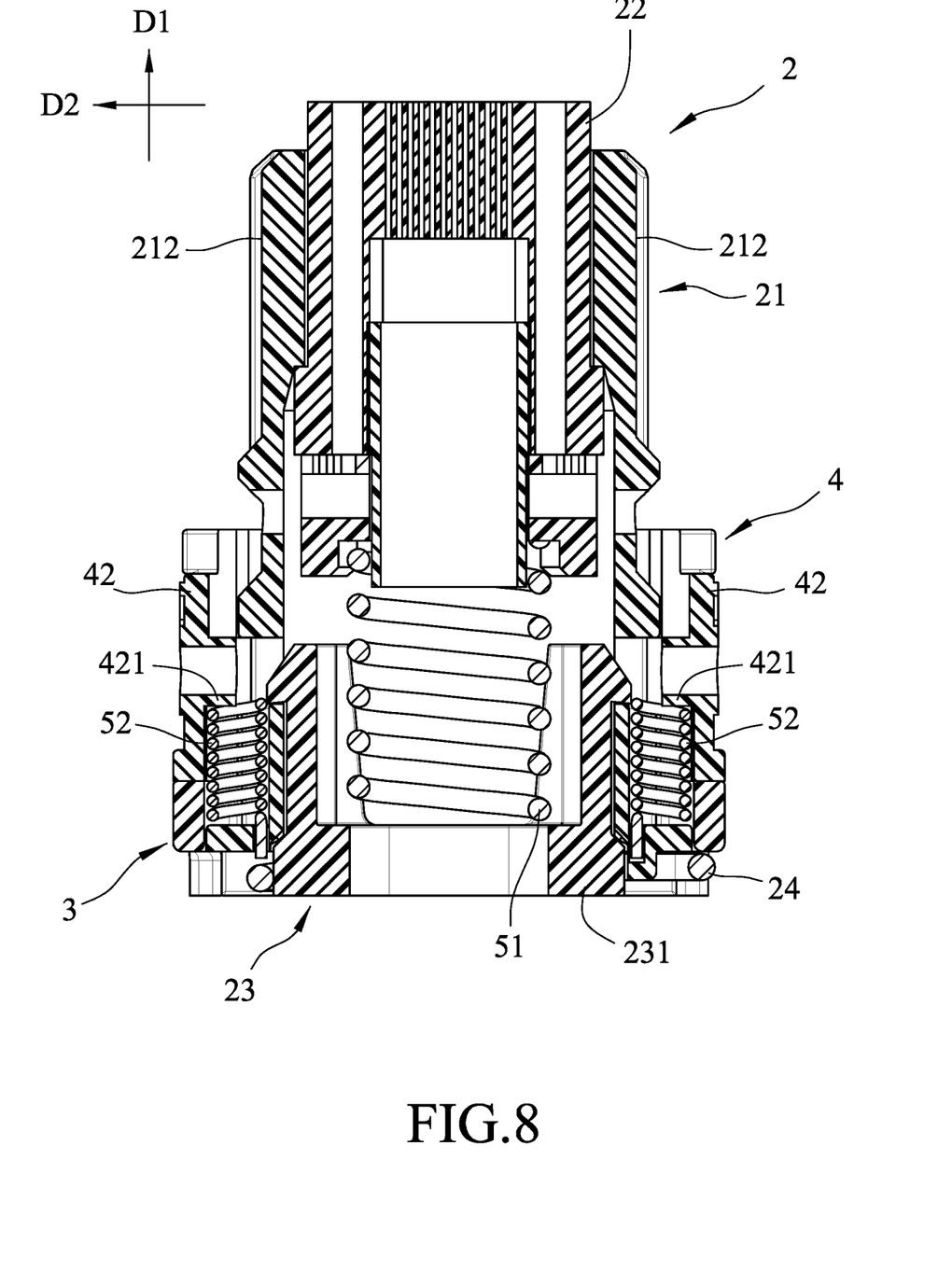
FIG. 8 is a view similar to FIG. 6, illustrating two lateral springs of a buffering unit being compressed by a sleeving unit.

Referring to FIG. 8 in conjunction with FIG. 4, when the embodiment is to be plugged into the plugging hole 90 of the adapter 9 in the front-rear direction (D1), the plug-in unit 2 is plugged into the main hole portion 901 of the plugging hole 90, and the connecting key 32 of the connecting unit 3 extends into the keyway 902 of the plugging hole 90. When the sleeving unit 4 experiences depression resulted from its contact with the adapter 9, the sleeving unit 4 is operable to move rearwardly relative to the plug-in unit 2 in the front-rear direction (D1) so that the positioning blocks 421 respectively compress the lateral springs 52 to generate a restoring force acting on the sleeving unit 4. When the embodiment is unplugged from the adapter 9, the above-mentioned restoring force restore the sleeving unit 4 back to its original position (FIG. 6), and the lateral springs 52 return to their uncompressed state.

Figure 9:
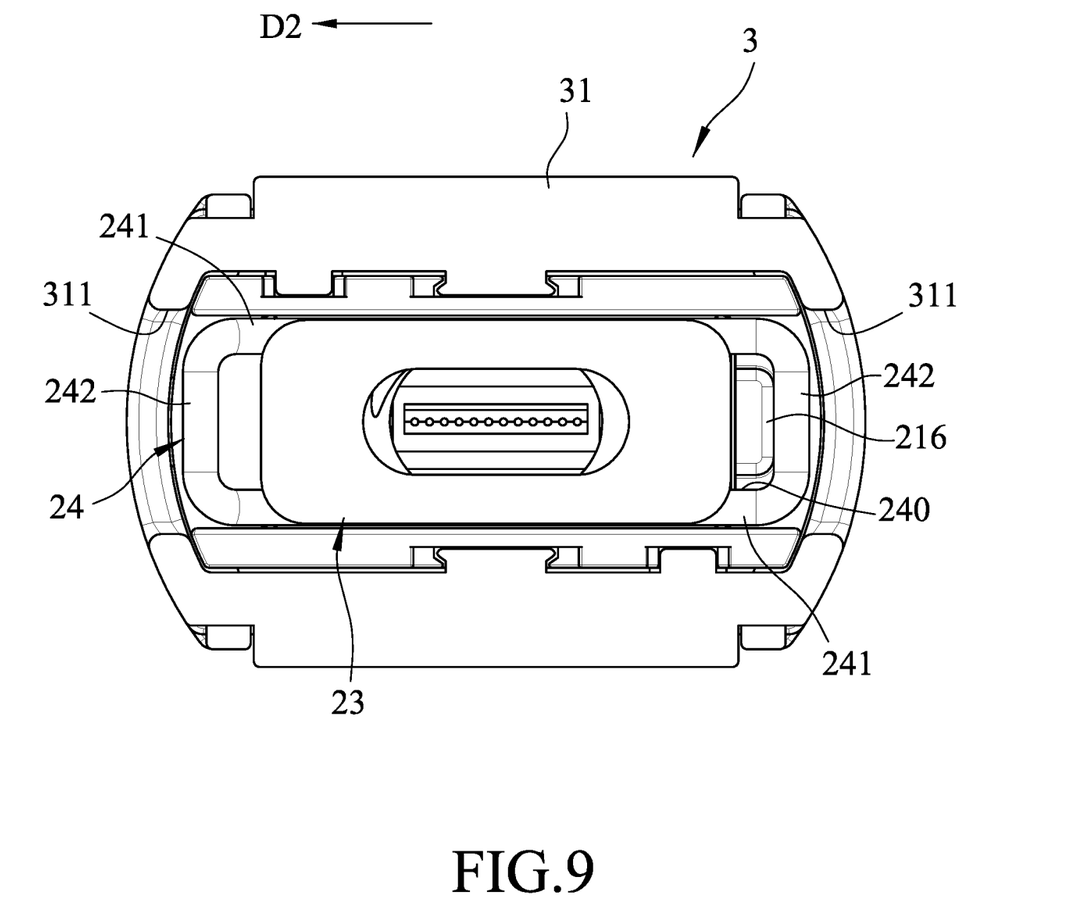
FIG. 9 is a rear view of the embodiment, illustrating a switch member of a plug-in unit at an adjusting position.
Figure 10:
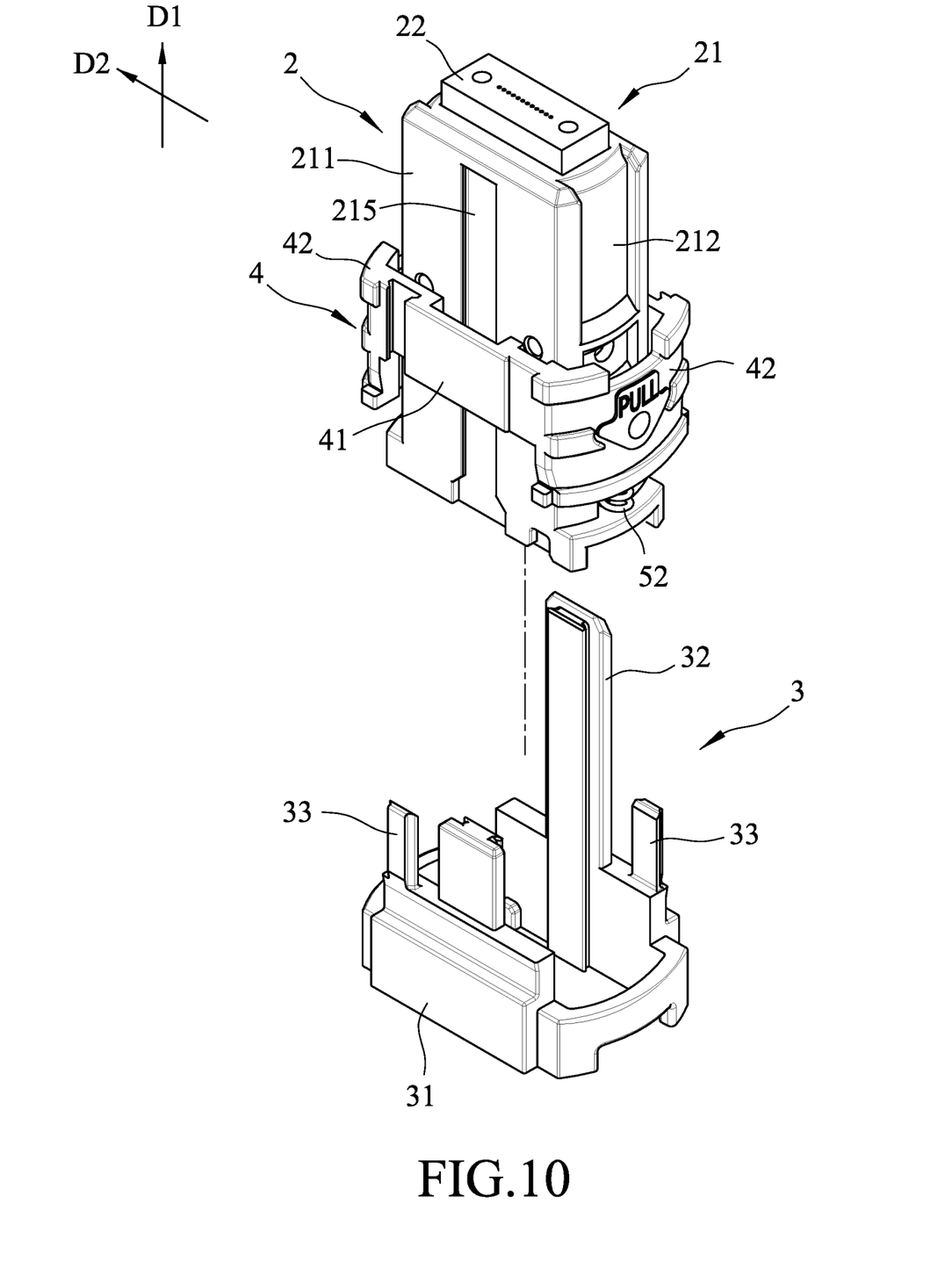
FIG. 10 is a partly exploded perspective view of the embodiment, illustrating orientation of a connecting key of a connecting unit relative to the plug-in unit being flipped.

Referring to FIGS. 5, 9 and 10, the position of the connecting key 32 of the connecting unit 3 may be adjusted when the switch member 24 is moved from the locking position (FIG. 5) to the adjusting position (FIG. 9), where the switch member 24 is moved outside of and away from the through grooves 311, such that the switch member 24 does not block movement of the connecting unit 3 in the front-rear direction (D1). Specifically, one of the interconnecting segments 242 of the switch member 24 proximate to the protruded segment 216 of the end wall 213 abuts against the protruded segment 216, so that the connecting unit 3 as a whole is operable to be separated from the plug-in unit 2 to change its orientation relative to the plug-in unit 2. In the embodiment, it should be noted that while the other one of the interconnecting segments 242 moves toward the corresponding one of the through grooves 311 when the switch member 24 switches from the locking position (FIG. 5) to the adjusting position (FIG. 9), it would not extend through the corresponding through groove 311 in either positions.

Figure 11:
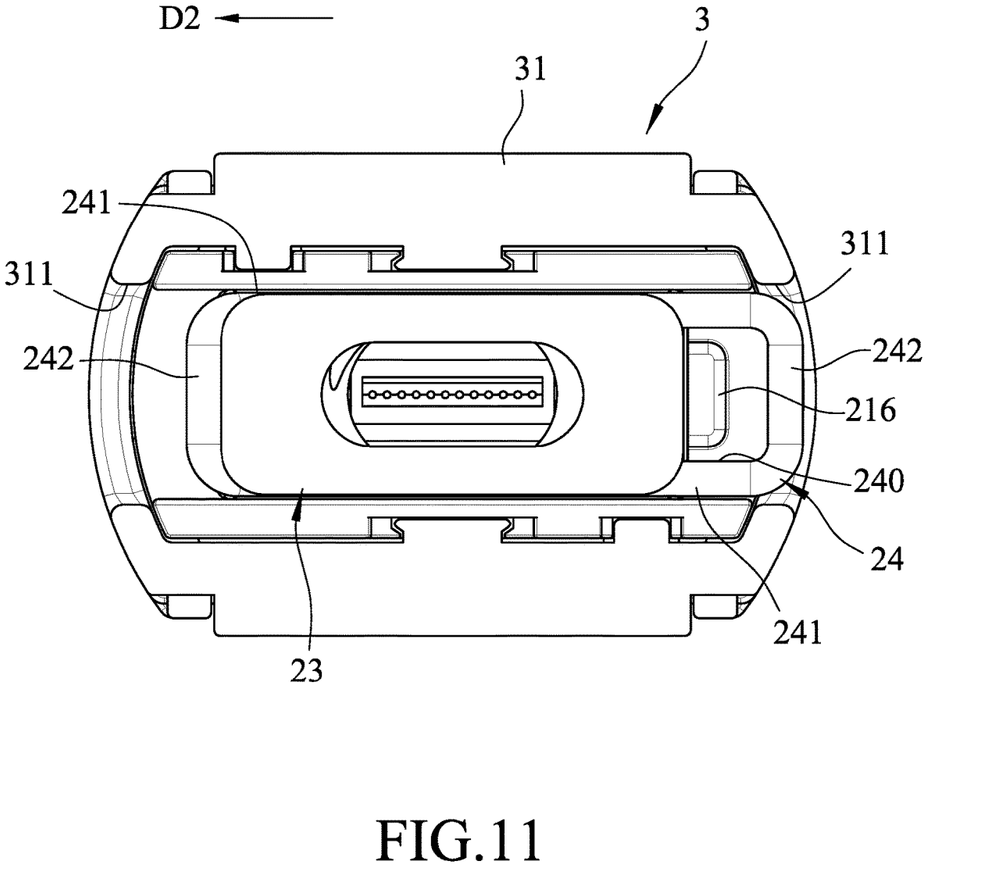
FIG. 11 is a view similar to FIG. 9, illustrating the switch member at a locking position.
Figure 12:
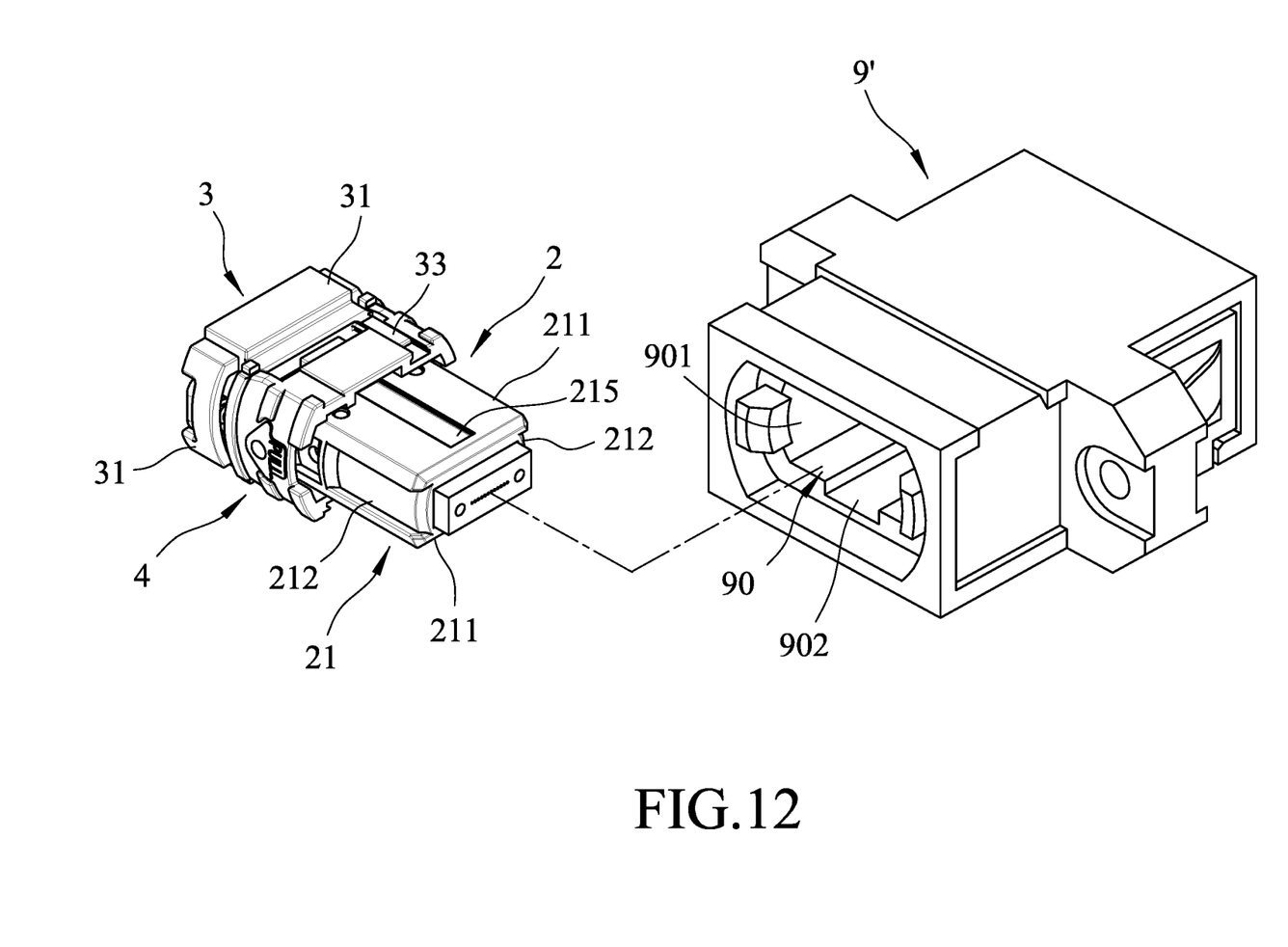
FIG. 12 a view similar to FIG. 4, illustrating the fiber optic connector being adapted to be plugging to an adapter with a different configuration.

Referring to FIGS. 11 and 12, after the adjustment to the connecting unit 3 is finished, the switch member 24 is moved toward and into one of the through grooves 311 to be at the locking position, preventing separation of the connecting unit 3 from the plug-in unit 2 by blocking the movement of the connecting unit 3 in the front-rear direction (D1). Specifically, in FIG. 11, the interconnecting segment 242 proximate to the protruded segment 216 moves into the through groove 311 that is also proximate to the protruded segment 216, while the interconnecting segment 242 distal to the protruded segment 216 moves toward and is in close contact with the positioning member 23. After the switch member 24 is moved to the locking position, the fiber optic connector may be plugged into the main hole portion 901 of the plugging hole 90 of an adapter 9' with a different configuration, with the connecting key 32 being adapted for extending into the keyway 902 formed at the bottom of the main hole portion 901.

Overall, the switch member 24 of the plug-in unit 2 is utilized for locking and for adjusting the position of the connecting unit 3 relative to the plug-in unit 2 without removing the sleeving unit 4 from the plug-in unit 2.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector adapted to be plugged into a plugging hole of an adapter in a front-rear direction, the plugging hole having a main hole portion and a keyway that is in spatial communication with the main hole portion, the fiber optic connector comprising:
    a plug-in unit adapted to be plugged into the main hole portion of the plugging hole, and including
        a hollow outer casing that defines an inner space therethrough which extends in the front-rear direction,
        a wiring module that is mounted in and extends forwardly from said inner space, and that is for being engaged with an optical fiber,
        a positioning member that is removably engaged with a rear end of said outer casing and that extends into said inner space, and
        a switch member that is movably mounted to said positioning member, that is movable in a lateral direction perpendicular to the front-rear direction, and that is operable to move between a locking position and an adjusting position,
    a connecting unit separably connected to a rear end of said plug-in unit, and including
        a surrounding body that surrounds said outer casing and that is formed with two through grooves respectively extending through two opposite lateral sides of said surrounding body in the lateral direction, and
        a connecting key that extends forwardly from said surrounding body, and that is adapted for extending into the keyway of the plugging hole when said plug-in unit is plugged into the main hole portion, when said switch member of the plug-in unit is at the adjusting position, said switch member being moved outside of and away from said through grooves and said connecting unit being operable to be separated from said plug-in unit, and when said switch member is at the locking position, said switch member being moved toward and into one of said through grooves to prevent separation of said connecting unit from said plug-in unit, and
    a sleeving unit sleeved to said plug-in unit, disposed to a front end of said connecting unit, and lapped over said connecting key.

2. The fiber optic connector as claimed in claim 1, wherein said outer casing of said plug-in unit has two spaced-apart and parallel main walls each of which is formed with a guiding groove for said connecting key of said connecting unit to be engaged therewith, two spaced-apart side walls that are respectively connected to two opposite lateral edges of each of said main walls, and an end wall that is connected to rear ends of said main walls and said side walls.

3. The fiber optic connector as claimed in claim 2, wherein:
    each of said side walls of said outer casing of said plug-in unit is formed with a through hole; and
    said positioning member of said plug-in unit has a base portion and two hook portions that extend forwardly from said base portion and that respectively hook onto said through holes to be positioned thereto.

4. The fiber optic connector as claimed in claim 3, wherein:
    said positioning member of said plug-in unit further has two switch grooves that extend in the lateral direction and that are respectively indented into two opposite sides of said base portion;
    said switch member of said plug-in unit has two moving segments that are respectively and movably mounted in said switch grooves and two interconnecting segments that are respectively connected to two opposite ends of each of said moving segments and that cooperate with said moving segments to define a central hole thereamong; and one of said interconnecting segments is moved into a corresponding one of said through grooves of said connecting unit when said switch member is at the locking position.

5. The fiber optic connector as claimed in claim 4, wherein:
said end wall of said outer casing has a protruded segment that is proximate to one of said through grooves of said connecting unit and that protrudes outwardly into said central hole of said switch member for restricting range of movement of said switch member; and
one of said interconnecting segments abuts against said protruded segment when said switch member is at the adjusting position.

6. The fiber optic connector as claimed in claim 4, wherein one of said moving segments of said switch member of said plug-in unit has a cutoff section.

7. The fiber optic connector as claimed in claim 2, wherein:
said sleeving unit includes
two parallel and spaced-apart lapping walls that is for lapping over said connecting key, and
two spaced-apart curved walls that are respectively connected to two lateral edges of each of said lapping walls;
each of said lapping walls has a coupling groove that extends in the front-rear direction; and
said connecting unit further includes two coupling tongues that extend forwardly in the front-rear direction from said surrounding body and that respectively extend into said coupling grooves.

8. The fiber optic connector as claimed in claim 7, wherein:
each of said side walls of said outer casing is formed with an indented mounting groove; and
the fiber optic connector further comprising a buffering unit that is mounted to said plug-in unit and that includes
a central spring mounted in said inner space and disposed between said wiring module and said positioning member, and
two lateral springs respectively mounted to said mounting grooves of said side walls.

9. The fiber optic connector as claimed in claim 8, wherein:
each of said curved walls of said sleeving unit has a positioning block that protrudes inwardly toward the other one of the curved walls, and that abuts against a front end of a corresponding one of said lateral springs; and
said sleeving unit is operable to move rearwardly relative to said plug-in unit in the front-rear direction so that said positioning blocks respectively compress said lateral springs to generate a restoring force acting on said sleeving unit.

\* \* \* \* \*